UNITED STATES PATENT OFFICE.

WILLIAM J. WILSON, OF CHICAGO, ILLINOIS.

IMPROVEMENT IN PROCESSES FOR PRESERVING AND PACKING COOKED MEATS.

Specification forming part of Letters Patent No. 149,276, dated March 31, 1874; application filed March 24, 1874.

*To all whom it may concern:*

Be it known that I, WILLIAM J. WILSON, of Chicago, in the county of Cook and in the State of Illinois, have invented certain new and useful Improvements in Process for Preserving and Packing Cooked Meats for Transportation; and do hereby declare that the following is a full, clear, and exact description thereof.

The nature of my invention consists in a process for packing cooked meats for transportation in a compressed form, while heated with cooking, into an air-tight package, so as to preserve the meat in its integrity and retain all the natural juices and nutritious qualities of the meat.

In carrying out my invention, the meat is first cooked thoroughly at a temperature of 212° Fahrenheit, so that all the bone and gristle can be removed and the meat yet retain its natural grain and integrity. The meat is then in proper condition for eating, and is wholesome and palatable. A measured quantity of this cooked meat is then, while yet warm with cooking, pressed by any suitable apparatus into a previously-prepared box or case with sufficient force to remove the air and all superfluous moisture, and make the meat form a solid cake. The box or case is then closed air-tight upon the meat.

The meat is thus packed and compressed in its natural state—that is, without disintegration or desiccation—and it retains all the juices and nutritious qualities of the meat, the compression only removing the superfluous moisture. The meat thus put up is available at all times, even when cooking is impracticable, as it is already cooked before it is packed. It is more economical, as it is compressed and reduced in weight one-half from the uncooked weight, being free from bone and gristle, and put up in a compact portable shape for transportation, rendering the usual expensive cooperage unnecessary. Besides this, there is a great saving in the cost of transportation. A barrel containing two hundred pounds uncooked meat weighs, gross, three hundred and twenty pounds, meat, salt, brine, and barrel, while by my process it would weigh only one hundred and ten pounds gross, making a saving in cost of freight alone of nearly two-thirds.

The box or case may be made of wood or metal, or both combined, of any suitable form or shape, and of any desired dimensions.

Having thus fully described my invention, what I claim as new, and desire to secure by Letters Patent, is—

1. The within-described process for packing cooked meats for transportation by compressing the same, while heated with cooking, into an air-tight package, so as to preserve the meat in its integrity and retain all the natural juices and nutritious qualities of the meat, substantially as set forth.

2. As a new article of merchandise, cooked meat put up in solid form, in its natural state, without disintegration or desiccation, in hermetically-sealed packages, as set forth.

In testimony that I claim the foregoing I have hereunto set my hand.

WILLIAM J. WILSON.

Witnesses:
F. C. RUSSELL,
GEORGE L. THATCHER.